Jan. 31, 1967  L. A. JOHANNSEN  3,300,876
INSTRUCTION AID
Filed June 1, 1964  4 Sheets-Sheet 1
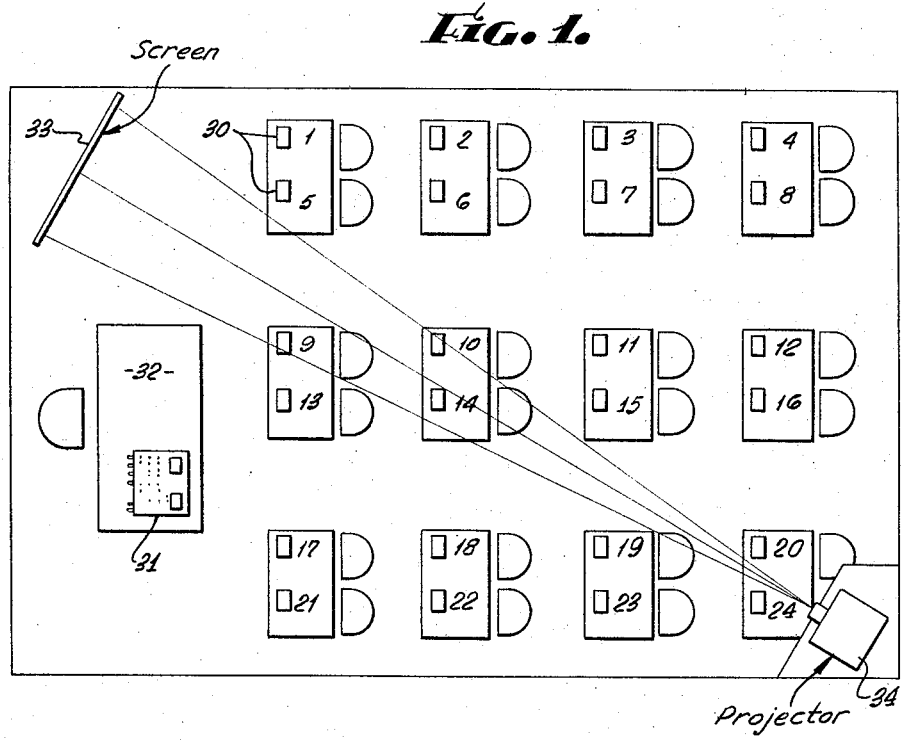
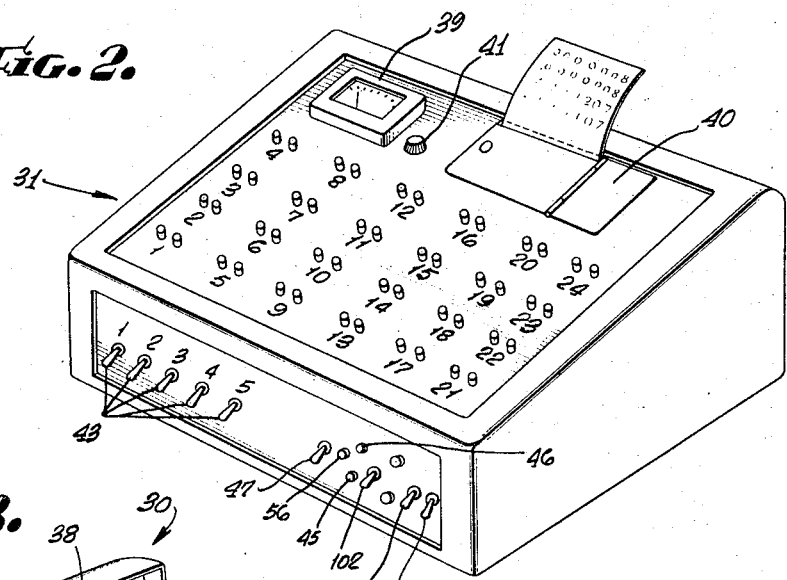
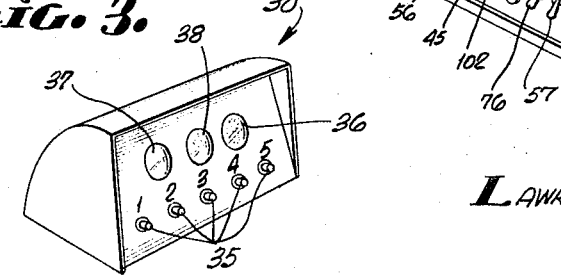
INVENTOR.
LAWRENCE A. JOHANNSEN
BY Flam and Flam
ATTORNEYS.

Jan. 31, 1967 L. A. JOHANNSEN 3,300,876
INSTRUCTION AID
Filed June 1, 1964 4 Sheets-Sheet 2
FIG. 4.
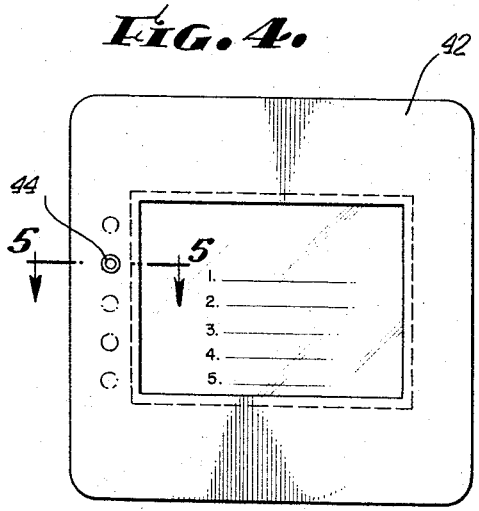
FIG. 7.
```
0 0 0 0 0 0 0 0 0 0 0   8
0 0 0 0 0 0 0 0 0 0 0   8
0 0 0 0 0 0 0 0 0 0 0   7
0 0 0 0 1 1 0 0 0 0 0   7
0 1 0 1 0 0 0 0 0 1 0   6
0 0 0 0 1 1 0 0 0 0 0   6
0 1 0 0 0 0 0 0 1 0 0   5
0 0 1 1 1 0 0 0 0 0 0   5
0 0 0 1 0 1 1 0 0 0 0   4
0 1 1 1 1 1 0 0 0 0 0   4
```
FIG. 5.
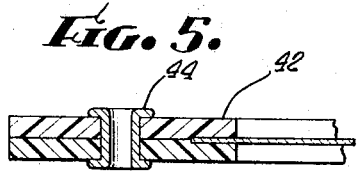
FIG. 6.
MODULATION OF A CARRIER IS ACHIEVED
BY THE _____ OF TWO SIGNALS.
    1. DIFFERENTIATING
    2. INTEGRATING
    3. ADDING
    4. MIXING
    5. DOUBLING
INVENTOR.
LAWRENCE A. JOHANNSEN
BY Flam and Flam
ATTORNEYS.

Jan. 31, 1967    L. A. JOHANNSEN    3,300,876
INSTRUCTION AID
Filed June 1, 1964    4 Sheets-Sheet 3
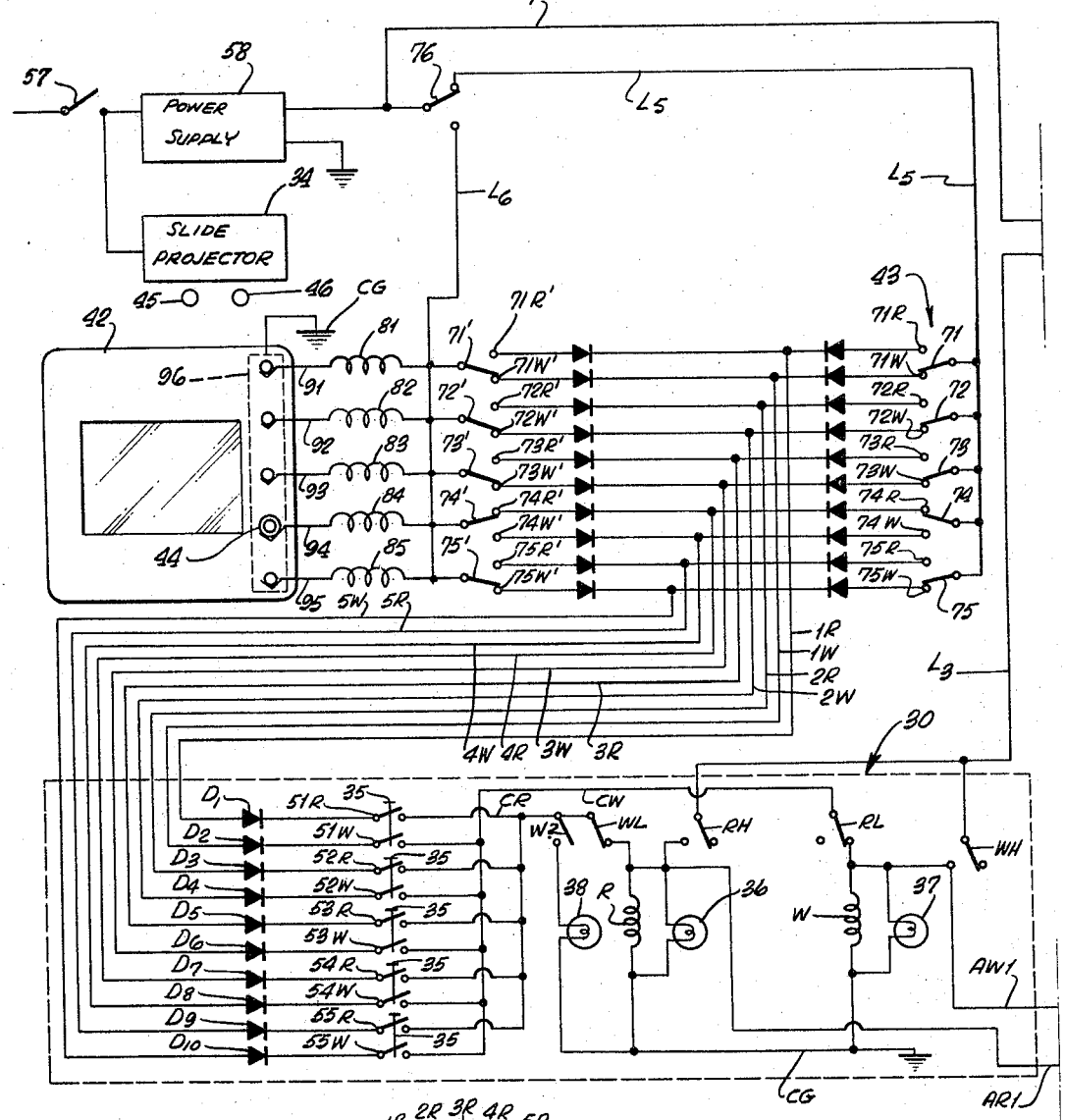
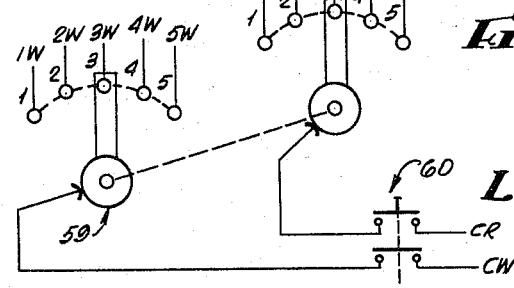
INVENTOR.
LAWRENCE A. JOHANNSEN
BY Flam and Flam
ATTORNEYS.

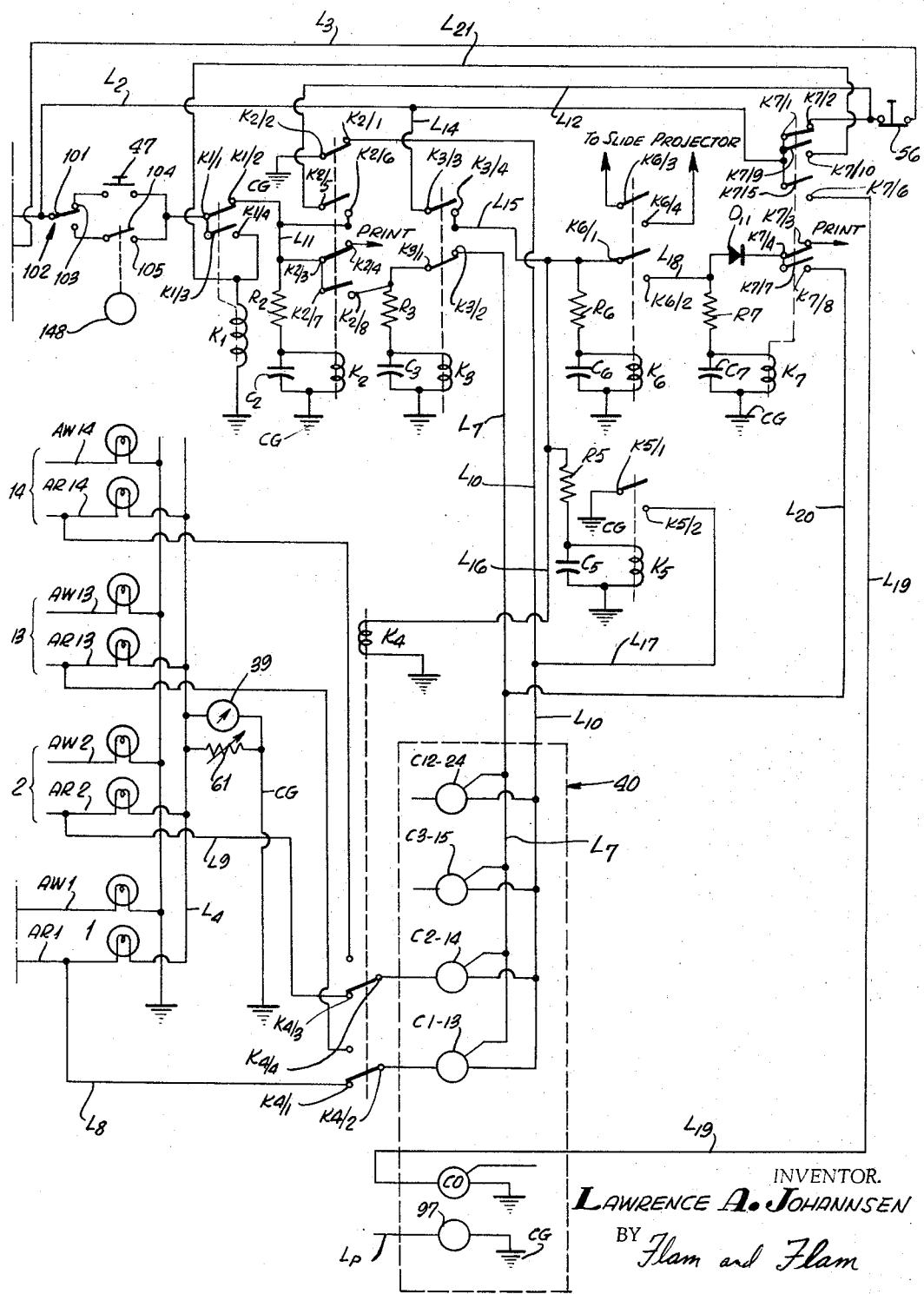

United States Patent Office 3,300,876
Patented Jan. 31, 1967

3,300,876
INSTRUCTION AID
Lawrence A. Johannsen, San Gabriel, Calif., assignor to Dressen-Barnes Electronics Corporation, Pasadena, Calif., a corporation of California
Filed June 1, 1964, Ser. No. 371,274
28 Claims. (Cl. 35—9)

This invention relates to apparatus adapted to be used by an instructor as an aid to classroom teaching.

When one student in a class is called upon for an answer to a specific question, there is no way of knowing if others would have given the same or a different answer. Hence the instructor can only estimate the learning rate of the entire class. He has no sure way of knowing whether or not he is proceeding at a proper pace. Private instruction or small classes seemingly provide the only answer. The primary object of this invention is to provide apparatus for overcoming these disadvantages, and which makes possible instruction of a relatively large class on an individual basis. Thus the answers of all of the student are displayed, and if desired, recorded, without in any way slowing down the course of instruction; in fact, it is speeded.

Another object of this invention is to provide apparatus of this character that greatly simplifies the job of giving and grading class examinations. For this purpose, the apparatus automatically displays, in sequence, multiple choice questions, allows a preset time for answer of each question, records whether the answer is right or wrong with a position or other code to identify each student, and provides a compact printed record.

Another object of this invention is to provide apparatus of this character that can be used for taking and recording roll.

Another object of this invention is to provide a system including a master console for use by the instructor and a series of remote consoles for use by the students for effectively aiding the teaching process.

Another object of this invention is to provide a system of this character in which the student selects his answer by operating one of a number of switches, and in which the student's first selection is held while the correct answer may be displayed at the student console as soon as the student operates the switch corresponding to the correct answer.

Another object of this invention is to provide a visual display for the instructor that reads directly in percent of the entire class in attendance, the ratio of students correctly answering, and whatever the total attendance might be.

Another object of this invention is to provide apparatus of this character that is capable of various modes of operation to suit the needs of the situation. Thus the apparatus may be used in conjunction with slide projection apparatus to display the appropriate question as well as to provide data to the logical circuits as to which of several answers is correct. Furthermore, the apparatus is capable of a mode of operation in which the instructor applies the data to the logical circuits corresponding to correct or incorrect answers.

Further objects of this invention are to provide simple logic circuitry for accomplishing the foregoing results.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a diagrammatic view illustrating the location of components of the system in a classroom;

FIG. 2 is a pictorial view of the instructor's console;

FIG. 3 is a pictorial view of one of the students' consoles;

FIG. 4 is an enlarged plan view of a slide forming a part of the system;

FIG. 5 is an enlarged fragmentary sectional view taken along a plane corresponding to line 5—5 of FIG. 4;

FIG. 6 is a pictorial view of the image projected by the slide;

FIG. 7 is a view of a portion of a tape produced by the printer; and

FIGS. 8a, 8b and 9 are wiring diagrams.

In FIG. 1 there is illustrated a classroom for accommodating twenty-four students at twelve desks. Each student is provided with a console 30 (see also FIG. 3) by the aid of which he can select an answer to a multiple-choice or true-false question. The students' consoles are numbered 1 to 24 corresponding to the students.

An instructor's console 31 is located at a desk 32. At the instructor's console 31 the answers of individual students are displayed.

The questions may be given orally by the instructor or they may be displayed upon a screen 33 by a slide projector 34.

In FIG. 6 there is illustrated a typical multiple-choice question with possible answers 1–5. The student depresses one of a number of buttons 35 corresponding to the answers 1, 2, 3, 4 and 5. If the student selects the proper answer (4), a green light 36 turns on and stays on. If the student selects any one of the other answers, a red light 37 turns on and stays on while the green light is precluded from being energized. If the red light turns on, the student may try other buttons and find the correct answer. Thus, when he depresses the button for the correct answer, a yellow light 38 will be energized.

The teacher's console has twenty-four pairs of lights numbered 1 to 24, as shown in FIG. 2, and corresponding to the students. For purposes of convenience, these pairs of lights are arranged in rows corresponding to the rows of students in the classroom so that the instructor may visually coordinate the pairs of lights respectively with the students. One of the pairs of lights for each student is green and the other is red, corresponding respectively to "right" and "wrong." Should student No. 8, for example, select the correct answer, the green light will be energized at position No. 8 on the instructor's console. Correspondingly, should student No. 8 select the wrong answer, his red light will be illuminated at the instructor's console.

The instructor's console also includes a meter 39 having a moving pointer that displays the percentage of correct answers of the class. By such means the instructor may judge the learning rate of the class as a whole. In order to calibrate the ammeter 39 in accordance with the class attendance, a dial knob 41 is provided. The manner in which the dial knob is operated will be described hereinafter. Furthermore, the instructor's console includes a printer 40 of known type for permanently recording the answers.

In place of a multiple-choice question, a true-false question may be used. In this instance, there will be only two proposed answers; namely (1), true, and (2), false. To indicate "true" the student depresses a button 35 corresponding to No. 1, and to indicate "false," he depresses a button 35 corresponding to answer No. 2.

The apparatus may be encoded either by the slide 42 (FIGS. 4 and 5) or by a series of five switches 43 (FIG. 2) manually operable by the instructor. In posing multiple-choice questions in which the third answer is correct, the instructor operates the switch 43 corresponding to answer No. 3. The slide 42 performs a function equivalent to operation of one of the switches 43 by virtue of relays hereinafter to be described. The correct answer is encoded on the slide by the aid of a conductive hollow grommet 44 situated at one of five positions on the slide, the position of the grommet corresponding to the correct answer.

The teacher's console may incorporate suitable control switches 45 and 46 for controlling the projector 34. For example, upon depression of the button 45, the projector may advance to the next slide. By operating the button 46, the projector may be caused to reverse.

The students' consoles 30 are all operatively connected to the teacher's console 31 by suitable means. The most convenient way for accomplishing this is by the aid of conductors, preferably accommodated in a conduit beneath the floor of the classroom. Other arrangements, of course, could be provided for achieving the operative connection.

The printer 40 has thirteen pulse counters for operating character wheels. The characters on each wheel are: 0, 1, 2, 3, 4, 5, 6, 7, 8, and 9. Special wheels, of course, can be provided. Except for the right hand or thirteenth counter wheel, which denotes the question number, only the "0" and "1" positions are used to denote wrong or right respectively. To write the scores of all of the students, two lines are printed. The first line prints out the score of the first twelve students and the question number, and the second line prints out the score of the second twelve students and the question number. For question No. 6, for example, students 2, 4, 10, 11, 17 and 18 selected the right answer, whereas the other students selected the wrong answer, or were absent. The printer may be caused to print two lines of information by operation of a print switch 47 located on the teacher's console.

The circuitry for achieving the foregoing mode of operation is shown in FIG. 8.

In FIG. 8 there is illustrated, by the dotted rectangle 30, one of the students' consoles. Cooperable with all of the consoles 30 are common control conductors 1R, 1W, 2R, 2W, 3R, 3W, 4R, 4W, 5R and 5W. The bus conductors 1R, 1W, 2R, 2W . . . 5R, 5W condition the consoles for appropriate operation. The console for student No. 1 has a pair of leads AR1 (answer right) and AW1 (answer wrong). The console for student No. 2 (not shown) has a pair of leads AR2 (answer right) and AW2 (answer wrong). Other consoles have similar leads. These leads all return to the instructor's console 31 for purposes of operating the indicating lights on the instructor's console and for providing a suitable signal for operation of the pulse counter wheels associated with the printer 40.

Included in the student's console 30, in addition to the signal lights 36, 37 and 38, is a pair of relays R and W respectively operable when the student selects a right answer or wrong answer by depression of one of the buttons 35. The "right" relay R is paralleled by the green light 36, and the "wrong" relay is paralleled by the red light 37. Accordingly, whenever the respective relays are operated, the corresponding lights 36 and 37 are operated. The "right" relay R has normally closed lockout contacts RL for preventing subsequent operation of the "wrong" relay W, and normally open holding contacts RH for maintaining the energization circuit of the "right" relay R. Similarly, the "wrong" relay W has normally closed contacts WL for preventing subsequent operation of the "right" relay R and also normally open contacts WH for holding the "wrong" relay W energized. Additionally, relay W has normally open "query" contacts W? that condition the yellow light 38 for operation.

The buttons 35 each operate a pair of switches spring biased to open position. The first button operates switches 51R and 51W. The second button operates switches 52R and 52W. The third button operates switches 53R and 53W. The fourth button operates switches 54R and 54W. And the fifth button operates switches 55R and 55W. Power is supplied either to the switch 51R or 51W depending upon whether selection of the corresponding button is right or wrong. Similarly, power is supplied to one of each of the other pairs of switches. Thus, for example, if only answer No. 4 is correct, power will be supplied to one side of the switches 51W, 52W, 53W, 54R and 55W. All of the "wrong" switches 51W, 52W, 53W, 54W and 55W when closed connect the power, if any, to a control lead CW. All of the "right" switches 51R, 52R, 53R, 54R and 55R when closed connect power, if any, to a control lead CR.

If the student depresses the button 35 for operation of the switches 54R and 54W (answer No. 4), power will be applied through the switch 54R to the control lead CR. This will cause energization of the "right" relay through the normally closed contact WL of the "wrong" relay. Since power is not applied to the switch 54W, the control lead CW will remain deenergized. As the relay R is energized, the holding contacts RH provide energization independent of the switch 54R and the lockout contacts WL. This holding circuit includes normally closed relay contacts K7/1-K7/2 of a relay K7 forming a part of the printer circuit, hereinafter to be described, as well as a normally closed manually operable switch 56. The circuit may be traced as follows: a main power switch 57, a D.C. power supply 58, lead L1, lead L2, relay contacts K7/1-K7/2, switch 56, lead L3, "right" relay holding contacts RH, relay R to common ground CG. The relay contacts are illustrated diagrammatically as a movable arm and a relatively stationary arm; the actual contacts carried by the arms are not shown. The "wrong" relay W cannot thereafter be energized until the holding circuit for relay R is interrupted either by switch 56 or operation of relay K7. Thus, the normally closed lockout relay contacts RL operated by the relay R must be closed top provide initial energization of relay W.

Should the student initially select the button corresponding to the wrong answer, power will be applied to the control lead CW rather than the control lead CR. This will result in energization of the "wrong" relay W through the normally closed contacts RL of the right relay. Upon energization of the "wrong" relay W, a holding circuit is established by normally open holding contacts WH which connect the relays to the power lead L3.

The corresponding relay R or W is energized and held in energized condition in accordance with the first selection of the student.

In the event that the student selects the wrong answer, he may subsequently cause the yellow light 38 to be operated upon depression of the key or button corresponding to the right answer. This is accomplished by normally open contacts W? operated by the "wrong" relay. Upon energization of the "wrong" relay, the contacts W? are closed and condition energization of the yellow light 38 through the control lead CR. Thus, upon operation of the switch which is effective to provide energization to the control lead CR (and which occurs only upon depression of the button corresponding to the right answer), the energization is provided for the yellow light 38.

Diodes D1, D2, D3 . . . D10 prevent unintended operation should a student simultaneously operate a plurality of buttons. Thus, if not for diodes, all of the control leads 1R, 1W, 2R, 2W, 3R, etc. could be energized simply by operation of a plurality of buttons simultaneously. This unintended operation can also be avoided by using a double deck five position selector switch 59, shown in FIG. 9, in conjunction with an operating switch 60.

The leads AR1 and AW1 which return to the instructor's console are shown in FIG. 8. One end of the lead AW1 (answer wrong) connects to that side of the "wrong" relay W remote from the common ground connection CG and thus is provided with power whenever the "wrong" relay W is energized. Similarly, one end of the lead AR1 (answer right) connects to that side of the "right" relay R remote from the common ground CG and is thus provided with a source of power whenever the "right" relay R is energized. The lead AW1 connects to the appropriate red indicating lamp of the set 1 on the instructor's console and a circuit is established for the lamp directly to the common ground CG. The lead AR1 connects through the corresponding lamp of the set 1 to a lead L4 to one side of the ammeter 39, the other side of the ammeter being connected to the common ground lead CG. The green lamps energized by the right leads AR2 . . . AR13, AR14, etc. for all of the student consoles are all connected to the lead L4. Accordingly, the ammeter 39 measures by analogy the number of correct answers selected by the class.

An adjustable shunt 61 calibrates the ammeter so that it reads full scale or one hundred percent when all of the students in the class select a right answer. Accordingly, the ammeter 39 displays in a readable form the effectiveness of the lesson. Thus, for example, the instructor knows at a glance whether or not he must review a particular point before proceeding.

In order to calibrate the ammeter 39, power is supplied to all of the "right" conductors 1R, 2R, 3R, 4R and 5R while no power is applied to "wrong" conductors 1W, 2W, 3W, 4W and 5W. The students are requested to operate any button for the purpose of indicating their presence. Any button will produce a "right" answer and hence send current to lead L4. Current corresponding to correct answers of all the students then in attendance is available and passed to the ammeter 39. The shunt 61 is then manipulated for the initial calibration purposes. Furthermore, in a manner hereinafter to be described, the instructor can depress the switch 47 so that the printer records the roll.

In order to code the student consoles and thus determine which of each pair of leads 1R–1W; 2R–2W; etc. is to be provided with power, the switches 43 shown in FIG. 8 as well as in FIG. 2 may be operated. Each of the switches 43 has an arm 71, 72, 73, 74 and 75 (FIG. 8) connected to a lead L5 Power is provided to the lead L5 from power supply 58, and a selector switch 76. Contacts 71R and 71W optionally engageable by the arm 71 are respectively connected to the leads 1R and 1W and thus to the terminals of the switches 51R and 51W at each of the students' consoles. The switch 71 is shown in position to engage the contact 71W and accordingly to provide energization to the lead 1W and not to the lead 1R. Thus, if the student operates the button 35 for answer No. 1, the wrong relay W will be energized. Similarly, the switch arm 72 cooperates optionally with contacts 72R and 72W; switch arm 73 cooperates with contacts 73R and 73W; switch arm 74 cooperates with contacts 74R and 74W; and switch arm 75 cooperates with contacts 75R and 75W.

In the particular example illustrated, the switch arms 71, 72, 73 and 75 provide energization to the bus conductors 1W, 2W, 3W and 5W, whereas the switch arm 74 is shown in a position to provide energization to the bus conductor 4R. Accordingly, the student consoles are conditioned for appropriate operation. Desirably the instructor leaves all of the switches 43 in a position correspondingly to "wrong" since normally there will be but one correct answer. As a question is put, he simply operates the switch corresponding to the right answer, and the circuitry will perform the required functions indicated.

By moving the selector switch 76 to its opposite position, an auxiliary power lead L6 is energized and conditions the coded slides such as the slide 42 for operation of the conductors 1R, 1W, 2R . . . 5W. Relay arms 71', 72', 73', 74' and 75' are connected to the auxiliary power lead L6 and are engageable with front and back contacts 71R', 71W', 72R', 72W', 73R', 73W', 74R', 74W', 75R' and 75W' that are in turn respectively connected to the leads 1R, 1W, 2R, 2W, 3R, 3W, 4R, 4W, 5R and 5W. Blocking diodes isolate contacts 71R–71R', 71W–71W', etc. Operation of the relay arms 71', 72', 73', 74' and 75' accomplishes the same function as the manually operated switch arms 71–75. Individual relay coils 81, 82 83, 84 and 85 are provided for operating the respective relay arms 71'–75'. One side of each of the relays 81 to 85 connects to the auxiliary power lead L5, and the other side of each relay coil connects with wiper arms 91, 92, 93, 94 and 95. These arms 91–95 are located at the five positions of the slide 42 at which a grommet may be positioned. One of the arms, namely, the arm 94, engages the conductive grommet 44, and through the grommet a circuit is established to a common ground connection CG for cooperation with the corresponding relay 84. Thus, the side of the grommet opposite the wiper arm 94 engages a common grounded conductive strip 96 on that side of the slide 42 opposite the wiper arms. Upon energization of the relay coil 84, the arm 74' is moved to engage the contact 74R', and accordingly, the student consoles are conditioned for appropriate operation.

In FIG. 8 there is shown the printer 40 which provides the tape illustrated in FIG. 7. The printer has thirteen pulse counters C0, C1–13, C2–14, C3–15 . . . C12–24. The counter C0 is pulsed at every second line in order to register the question number. The pulse counter C1–13 positions a character wheel to provide the first row of characters as shown in FIG. 7; the pulse counter C12–24, the last character in the row of twelve. The counters C1–13, C2–14 . . . C12–24 have a common reset lead L7.

The printer also has a print solenoid 97 that causes the actual printing to take place in accordance with the condition of the pulse counters. At the completion of the print stroke, the tape automatically advances a line at a time in a known manner.

The lead AR1 from the first student console is connected via a lead L8 and back contacts K4/1–K4/2 of a relay K4 to the pulse counter C1–13. Accordingly, if the "right" relay R for student No. 1 is energized, the counter C1–13 will advance to the "1" position. Similarly, the lead AR2 from the second student console connects via a lead L9, back contacts K4/3–K4/4 of the relay K4 to the second pulse counter C2–14. The leads AR3, AR4 . . . AR12 for the first set of twelve student consoles similarly connect to the counters C3–15, C4–16 . . . C12–24 through back contacts of the relay structure K4. The other sides of the counters are all connected to a lead L10 to back contacts K2/1–K2/2 of a relay K2 to the common ground connection CG.

The leads AR13, AR14 . . . AR24 for the second set of twelve student consoles connect through front contacts K4/5–K4/6; K4/7–K4/8; etc. of the relay K4 to the pulse counters C1–13, C2–14 . . . C12–24 respectively. Accordingly, when the relay K4 is deenergized, the pulse counters C1–13, C2–14 . . . C12–24 are operated by the first set of twelve student consoles; and when the relay K4 pulls in, the counters C1–13, C2–14 . . . C12–24 are operated by the second set of twelve student consoles.

The relay K4, the reset lead L7, the print solenoid 97 and the counter C0 are operated by a logical circuit shown in FIG. 8. This circuit includes, in addition to the relays K4, K7 and K2, relays K1, K3, K5 and K6. The print switch 47 when first closed (time $t_0$) operates the print solenoid 97. The circuit may be traced as follows: power supply 58, lead L1, arm 101 of a selector switch 102 (see also FIG. 2), contact 103 of switch 102, print switch 47, back contacts K1/1–K1/2 of relay K1, lead L11, back contacts K2/3–K2/4 of relay K2 and lead LP to print solenoid 97 and ground CG. The lead LP is broken for illustrative purposes only. The legend "Print" is applied for purposes of clarity. At this moment $t_0$ the relay K4 is deenergized. Accordingly, when the switch 47 is operated $t_0$ the printer 40 prints out the answers of the first twelve students.

At time $t_2$, which may be 150 milliseconds after time $t_0$, the relay K2 pulls in and the print circuit is interrupted. This time delay is achieved by the aid of a resistor R2 which serves to connect lead L11 to the coil of relay K2, and a condenser C2 paralleling the coil of the relay K2. The other side of the relay coil connects to the common ground CG. This time delay allows adequate time for the print solenoid 97 to operate through back contacts K2/3–K2/4. When relay K2 pulls in at time $t_0$, contacts K2/1–K2/2 open and thus isolate the counters C1–13, C2–13 . . . C12–24 from ground.

As soon as the relay coil K2 pulls in, a holding circuit is effected through front contacts K2/5–K2/6. The holding circuit may be traced as follows: lead L1, lead L2, relay contacts K7/1–K7/2, a lead L12, relay contacts K2/5–K2/6, lead L11, resistor R2, coil of relay K2 to ground.

Also, as the relay K2 pulls in at time $t_2$, the counters C1–13, C2–14 . . . C12–24 are reset through front contacts K2/7–K2/8. This circuit may be traced from the lead L11, front contacts K2/7–K2/8, a lead L13, back contacts K3/1–K3/2 of relay K3 to the reset lead.

A short time after the relay K2 pulls in; that is, at time $t_3$, the relay K3 pulls in and interrupts the reset circuit which depends upon back contacts K3/1–K3/2. This time delay allows an adequate time for the counters to be reset through the lead L7.

The relay K3 has an energization circuit which includes a resistor R3. The circuit may be traced from the lead L13, resistor R3, to the coil of relay K3, to the ground connection CG. A condenser C3 parallels the coil of the relay K3.

The energization circuit for the coil of the relay K3 is established through a time delay circuit as follows: front contacts K2/7 and K2/8 of relay K2, lead L13, a resistor R3 through the coil to the common ground connection CG, a condenser C3 paralleling the coil of the relay K3. The coil of the relay K3 is held energized with the coil of the relay K2 by virtue of the front contacts K2/7–K2/8. Accordingly, when the relay K2 drops out, so also will the relay K3, but in time delayed relationship.

At time $t_3$ when the relay K3 pulls in, the relay K4 is first energized. This circuit is established from the power lead L2, lead L14 through front contacts K3/3–K3/4 of the relay K3, to a lead L15, lead L16 to one side of the coil of the relay K4, the other side being connected to ground CG. The circuits from the student consoles 13 to 24 are thus respectively placed in circuit relationship with the counters C1–13, C2–14, C3–15 . . . C12–24.

Before again operating the print solenoid 97, the ground connection for the counters must first be restored to allow passage of signals from the second set of student consoles. For this purpose, the relay K5 is provided. However, the ground connection must not be restored at a time prior to the pull-in of the relay K4, for otherwise the circuits from the first set of student consoles would be effective. To achieve this delay, a resistor R5 is provided in series with the coil for the relay K5 as well as a condenser C5 paralleling the coil. The resistor R5 connects with the lead L16 which energizes the switching relay K4. Front contacts K6/1–K6/2 engage at time $t_5$ after the relay K5 has pulled in. An effective ground connection for the counters is restored through the following circuit: lead L10, branch lead L17, front contacts K5/1–K5/2 to ground CG.

When the ground connection is restored by operation of the relay K5, time must furthermore be allowed for the circuits from the second set of student consoles to operate the counters before the print solenoid 97 is again energized. For this purpose, the relay K6 is provided. Associated with the relay K6 is a time delay circuit having a sufficiently longer time constant than the circuit associated with the relay K5. A resistor R6 establishes a circuit to the coil of the relay K6 from the lead L15. A condenser C6 parallels the coil of the relay K6. At time $t_6$ when the relay K6 pulls in, a circuit is effected to print the solenoid lead L12. The circuit may be traced as follows: lead L15, front contacts K6/1–K6/2 of relay K6, a lead L18, a blocking diode D11, back contacts K7/3–K7/4 of relay K7 to a branch of lead L12 to the print solenoid 97. The blocking diode D11 prevents energization of the relay structures upon prior energization of the lead L12.

In order to advance the slide to the succeeding position, a circuit for advancing the slide projector is operated at time $t_6$. For this purpose, the relay K6 has front contacts K6/3–K6/4 that parallel the switch (not shown) operated by button 45. Of course, if no power is provided to the projector, this operation will be idle.

The relay K7 terminates the cycle. Thus the relay K7 interrupts the circuit to the print solenoid 97 after allowing an adequate time for its operation; it conditions a reset circuit for the counter; it interrupts the holding circuit for the relay K2; and it advances the question counter C0. A resistor R7 completes a power circuit for the coil of the relay K7 at time $t_6$. Thus, one side of the resistor R7 connects lead L18 to one side of the relay coil, the other side of the relay coil being connected to the ground CG. A condenser C7 parallels the coil of the relay K7.

At time $t_7$, the relay K7 pulls in, and the print cycle is completed.

When the relay K7 pulls in, power to the lead L3 for all of the student consoles is interrupted by opening of contacts K7/1–K7/2. Accordingly, the relays R and W will drop out and all of the pulse counters are then deenergized. At time $t_7$ the question counter C0 is also energized through front contacts of the relay K7. The circuit may be traced from the lead L18, front contacts K7/5–K7/6, a lead L19, to the question counter C0.

When the relay K7 pulls in, a branch lead L20 is energized in order to reset the counters. At this time the energization circuit for the student consoles is interrupted by opening of contacts K7/1–K7/2. However, a certain time is required to achieve resetting of the counters. This time delay occurs by virtue of the relatively long time constant of the circuit R3–C3 of the relay K3. Thus, as the contacts K7/1–K7/2 in the holding circuit for the relay K2 open, the relay K2 drops out and the circuit K3–C3 begins its transient decay. The relay contacts K3/3–K3/4, which provide energization to the leads L15 and L18 and the reset lead L20, separate only after a time interval adequate to allow resetting of the counters. When this occurs, the relays K5, K6 and K7 ultimately drop out and the control circuit is reset.

There is a possibility that the operator has kept the switch 47 depressed during the entire print cycle. To prevent the print cycle from repeating under such circumstances, the relay K7 at time $t_7$ operates the relay K1. This is achieved through the front contacts K7/9–K7/10 as follows: lead L2, contacts K7/9–K7/10, a lead L21 to the coil of relay K1 and to ground CG. Upon energization of the relay K1 in this manner, a holding circuit therefore is effected before the chain of relays begin to drop out as follows: line L1, switch 102, switch 47, front contacts K1/3–K1/4 to the lead L21 and coil of relay K2. Front contacts K1/1–K1/2 ore broken, and thus reenergization of relayl K2, etc. is prevented until the switch 47 is released and again operated.

In place of manual initiation of the print cycle, automatic operation may be provided by a timer 148. The timer has a switch 104 that may be inserted in the circuit by operation of the selector switch 102 (see also FIG. 2).

In the alternate position, the arm 101 engages a contact 105 and places the timer switch 104 in the circuit in place of manual switch 47. The timer may cause momentary closure of the switch 104 at any selected time interval.

The inventor claims:

1. In apparatus of the class described: a plurality of station consoles; switching means for each of the station consoles operable at the station consoles for registering one of a series of multiple choices; circuit means for each of the station consoles selectively operable in accordance with the choice so registered; program means grouping said circuit means into two classes corresponding to correct and incorrect; a master console remote from said station consoles; a pair of display devices for each of said station consoles and mounted on the master console, said display devices corresponding to correct and incorrect; and means operatively connecting said circuit means to one of the corresponding display devices in accordance with the grouping of the program means.

2. In apparatus of the class described: a master console; a plurality of station consoles; switching means for each of the station consoles operable at the station consoles for registering one of a number of choices; circuit means for each of the station consoles selectively operable in accordance with the choice so registered; means for holding the circuit means in a state corresponding to the first registered choice; program means for determining either the acceptability or the non-acceptability of the choice; a pair of display devices for each of the station consoles and mounted on the master console; and means operated by said circuit means in accordance with said program means for operating the corresponding display device.

3. In apparatus of the class described: a plurality of station consoles; switching means for each of the station consoles operable at the station consoles for registering one of a number of choices; circuit means for each of the station consoles selectively operable in accordance with the choice so registered; program means for determining in advance the acceptability and non-acceptability of the choice; means operated by said circuit means for displaying at a place remote from the station consoles the acceptability and non-acceptability of the choices made by operation of each of the station consoles; means for displaying at each station console the acceptability or non-acceptability of the choice made at the corresponding station console; and means dependent upon said program means for momentarily displaying acceptable choices upon selection thereof at said station consoles following an unacceptable choice.

4. In apparatus of the class described: a master console; a number of station consoles; a plurality of pairs of control leads; switching means for each of the station consoles for selecting one of the number of pairs of control leads for registering the choice of the operator of the station console; program means beyond the control of the operators of the station consoles for connecting a source of power to only one of each of the pairs of control leads in accordance with the acceptability or non-acceptability of the choice of the pair of control leads; resettable relay means operated by the switching means at each station console for signalling the acceptability or non-acceptability of the choice corresponding to the switching means operation; and means for displaying at the individual station consoles and at the master console the acceptability or non-acceptability of the choices.

5. In apparatus of the class described: a master console; a number of station consoles; a plurality of pairs of control leads; switching means for each of the station consoles for selecting one of the number of pairs of control leads for registering the choice of the operators of the station console; program means beyond the control of the operators of the station consoles for connecting a source of power to only one of each of the pairs of control leads in accordance with the acceptability or non-acceptability of the choice of the pair of control leads; a pair of visually distinct electrically energizable lights for each station console, and corresponding to acceptable and non-acceptable choices; relay means for each station console for energizing one of the lights in accordance with the first selection of the operator; a plurality of pairs of visually distinct lights at the master console for each of the station consoles; and circuit means for correspondingly illuminating the pairs of lights at the master console.

6. In apparatus of the class described: a master console; a number of station consoles; a plurality of pairs of control leads; switching means for each of the station consoles for selecting one of the number of pairs of control leads for registering the choice of the operator of the station console; program means beyond the control of the operators of the station consoles for connecting a course of power to one of each of the pairs of control leads in accordance with the acceptability or non-acceptability of the choice of the pair of control leads; a pair of visually distinct electrically energizable lights for each station console; a "right" relay having parallel energization circuits through one of each of said pair of control leads in dependence upon said switching means; a "wrong" relay having parallel energization circuits through the other of each of said pair of control leads in dependence upon said switching means; holding circuits for the corresponding relays; normally closed contact means in the energization circuit of one of the relays and opened upon energization of the other relay; normally closed contact means in the energization circuit of the other of the relays and opened upon energization of the said one relay; said lights respectively paralleling said relays; and a plurality of pairs of visually distinct electrically energizable lights at the master console respectively paralleling the pairs of lights of each of the station consoles.

7. In apparatus of the class described: a master console; a number of station consoles; a plurality of pairs of control leads; switching means for each of the station consoles for selecting one of the number of pairs of control leads for registering the choice of the operator of the station console; program means beyond the control of the operators of the station consoles for connecting a source of power to one of each of the pairs of control leads in accordance with the acceptability or non-acceptability of the choice of the pair of control leads; a pair of visually distinct electrically energizable lights for each station console; a "right" relay having parallel energization circuits through one of each of said pair of control leads in dependence upon said switching means; a "wrong" relay having parallel energization circuits through the other of each of said pair of control leads in dependence upon said switching means; holding circuits for the corresponding relays; normally closed contact means in the energization circuit of one of the relays and opened upon energization of the other relay; normally closed contact means in the energization circuit of the other of the relays and opened upon energization of the said one relay; said lights respectively paralleling said relays; a plurality of pairs of visually distinct electrically energizable lights at the master console respectively paralleling the pairs of lights of each of the station consoles; a meter; and circuit means for providing a signal corresponding to the number of acceptable choices for operating the meter.

8. In apparatus of the class described: a master console; a number of station consoles; a plurality of pairs of control leads; switching means for each of the station consoles for selecting one of the number of pairs of control leads for registering the choice of the operator of the station console; program means beyond the control of the operators of the station consoles for connecting a source of power to one of each of the pairs of control leads in accordance with the acceptability or non-acceptability of the choice of the pair of control leads; a pair of visually distinct electrically energizable lights for each station console; a "right" relay having parallel energization circuits through one of each of said pair of control leads in dependence upon said switching means; a "wrong" relay having parallel energization circuits through the other of each of said pair of control leads in dependence upon said switching means; holding circuits for the corresponding relays; normally closed contact means in the energization circuit of one of the relays and opened upon energization of the other relay; normally closed contact means in the energization circuit of the other of the relays and opened upon energization of the said one relay; said lights respectively paralleling said relays; a plurality of pairs of visually distinct electrically energizable lights at the master console respectively paralleling the pairs of lights of each of the station consoles; a meter; circuit means for providing a signal corresponding to the number of acceptable choices for operating the meter; and calibration means for controlling the proportionate relationship between said signal and said meter whereby the meter may be adjusted to read in percent acceptable choices despite variations in the number of operable station consoles.

9. In apparatus of the class described: a master console; a number of station consoles; a plurality of pairs of control leads; switching means for each of the station consoles for selecting one of the number of pairs of control leads for registering the choice of the operator of the station console; program means beyond the control of the operators of the station consoles for connecting a source of power to only one of each of the pairs of control leads in accordance with the acceptability or non-acceptability of the choice of the pair of control leads; said program means comprising a set of manually operable switches; circuit means operable by the switching means at each station console for signalling acceptability or non-acceptability of the choice corresponding to the switching means operation; and means for displaying at the individual station consoles and at the master console the acceptability or non-acceptability of the choices.

10. In apparatus of the class described: a master console; a number of station consoles; a plurality of pairs of control leads; switching means for each of the station consoles for selecting one of the number of pairs of control leads for registering the choice of the operator of the station console; program means beyond the control of the operators of the station consoles for connecting a source of power to only one of each of the pairs of control leads in accordance with the acceptability or non-acceptability of the choice of the pair of control leads; said program means including a coded projector slide; circuit means operable by the switching means at each station console for signalling acceptability or non-acceptability of the choice corresponding to the switching means operation; and means for displaying at the individual station consoles and at the master console the acceptability or non-acceptability of the choices.

11. In apparatus of the class described: a master console; a number of station consoles; a plurality of pairs of control leads; switching means for each of the station consoles for selecting one of the number of pairs of control leads for registering the choice of the operator of the station console; alternately operable program means beyond the control of the operators of the station consoles for connecting a surce of power to one of each of the pairs of control leads in accordance with the acceptability or non-acceptability of the choice of the pair of control leads; one of said program means comprising a set of manually operable switches, and the other of said program mean comprising a second set of switches and a coded projector slide for automatically operating the switches of the second set; a selector switch for conditioning the alternately operable program means; circuit means operable by the switching means at each station console for signalling acceptability or non-acceptability of the choice corresponding to the switching means operation; and means for displaying at the individual station consoles and at the master console the acceptability or non-acceptability of the choices.

12. In apparatus of the class described: a plurality of station consoles; switching means for each of the station consoles operable at the station consoles for registering one of a number of choices; circuit means for each of the station consoles selectively operable in accordance with the choice so registered; program means for determining the acceptability and non-acceptability of the choice; means operated by said circuit means for displaying at a place remote from the station consoles the acceptability and non-acceptability of the choices made by operation of each of the station consoles; and printing means for recording the acceptability and non-acceptability of the choices made at each station console.

13. In apparatus of the class described: a plurality of sets of station consoles; switching means for each of the station consoles operable at the station consoles for registering one of a number of choices; circuit means for each of the station consoles selectively operable in accordance with the choice so registered; program means for determining the acceptability or non-acceptability of the choice; and means operated by said circuit means for printing upon a common record medium and in corresponding sets the acceptability and non-acceptability of the choices made by operation of each of the station consoles.

14. In apparatus of the class described: a plurality of station consoles; switching means for each of the station consoles operable at the station consoles for registering one of a number of choices; circuit means for each of the station consoles selectively operable in accordance with the choice so registered; program means for determining the acceptability and non-acceptability of the choice; said circuit means being grouped in a number of sets corresponding to groups of station consoles; selector switch means for the sets of circuit means; a printer having a number of pulse counters respectively cooperable with said selector switch means, said pulse counters positioning characters for printing; and relay means for operating the selector switch and the printer whereby successive lines of printed matter correspond to successive sets of station consoles.

15. In apparatus of the class described: a master console; a number of station consoles; a plurality of pairs of control leads, each pair of control leads comprising a "right" lead and a "wrong" lead; switching means for connecting a source of power to one of each pair of leads; each station console having a "right" relay and a "wrong" relay; energization circuits for each of the relays including a common switch for connecting the "right" relay to a selected "right" lead and the "wrong" relay to the correspondingly selected "wrong" lead in accordance with the choice of the operator; the energization circuit for the "right" relay including normally closed contacts of the "wrong" relay; the energization circuit for the "wrong" relay including normally closed contacts of the "right" relay; each of said relays having holding circuits operated by normally open contacts thereof for energizing the corresponding relays independently of said control leads.

16. In apparatus of the class described: a master console; a number of station consoles; a plurality of pairs of control leads, each pair of control leads comprising a "right" lead and a "wrong" lead; switching means for connecting a source of power to one of each pair of leads; each station console having a "right" relay and a "wrong" relay, energization circuits for each of the relays including a common switch for connecting the "right" relay to a selected "right" lead and the "wrong" relay to the correspondingly selected "wrong" lead in accordance with the choice of the operator; the energization circuit for the "right" relay including normally closed contacts of the "wrong" relay; the energization circuit for the "wrong"

relay including normally closed contacts of the "right" relay; each of said relays having holding circuits operated by normally open contacts thereof for energizing the corresponding relays independently of said control leads; and a pair of indicator means operated respectively with the relays for denoting whether the selection was right or wrong.

17. In apparatus of the class described: a master console; a number of station consoles; a plurality of pairs of control leads, each pair of control leads comprising a "right" lead and a "wrong" lead; switching means for connecting a source of power to one of each pair of leads; each station console having a "right" relay and a "wrong" relay; energization circuits for each of the relays including a common switch for connecting the "right" relay to a selected "right" lead and the "wrong" relay to the correspondingly selected "wrong" lead in accordance with the choice of the operator; the energization circuit for the "right" relay including normally closed contacts of the "wrong" relay; the energization circuit for the "wrong" relay including normally closed contacts of the "right" relay; each of said relays having holding circuits operated by normally open contacts thereof for energizing the corresponding relays independently of said control leads; a pair of indicator lights at each station console operated respectively with the relays for denoting whether the switch selection was right or wrong; a third indicator light having an energization circuit including a selected "right" lead and normally open contacts of the "wrong" relay.

18. In apparatus of the class described: a master console; a number of station consoles; a plurality of pairs of control leads, each pair of control leads comprising a "right" lead and a "wrong" lead; switching means for connecting a source of power to one of each pair of leads; each station console having a "right" relay and a "wrong" relay; energization circuits for each of the relays including a common switch for connecting the "right" relay to a selected "right" lead and the "wrong" relay to the correspondingly selected "wrong" lead in accordance with the choice of the operator; the energization circuit for the "right" relay including normally closed contacts of the "wrong" relay; the energization circuit for the "wrong" relay including normally closed contacts of the "right" relay; each of said relays having holding circuits operated by normally open contacts thereof for energizing the corresponding relays independently of said control leads; a number of indicator means at the master console for denoting the selections at the respective station consoles, and operated in accordance with the "right" and "wrong" relays.

19. In apparatus of the class described: a master console; a number of station consoles; a plurality of pairs of control leads, each pair of control leads comprising a "right" lead and a "wrong" lead; switching means for connecting a source of power to one of each pair of leads; each station console having a "right" relay and a "wrong" relay; energization circuits for each of the relays including a common switch for connecting the "right" relay to a selected "right" lead and the "wrong" relay to the correspondingly selected "wrong" lead in accordance with the choice of the opertaor; the energization circuit for the "right" relay including normally closed contacts of the "wrong" relay; the energization circuit for the "wrong" relay including normally closed contacts of the "right" relay; each of said relays having holding circuits operated by normally open contacts thereof for energizing the corresponding relays independently of said control leads; a number of pairs of visually distinct electrically energizable lights at the master console for denoting the selections at the station consoles, one of each pair of lights being connected for operation with the corresponding "right" relays, and the others of each pair of lights being connected for operation with the correspoding "wrong" relays.

20. In apparatus of the class described: a master console; a number of station consoles; a plurality of pairs of control leads, each pair of control leads comprising a "right" lead and a "wrong" lead; switching means for connecting a source of power to one of each pair of leads; each station console having a "right" relay and a "wrong" relay; energization circuits for each of the relays including a common switch for connecting the "right" relay to a selected "right" lead and the "wrong" relay to the correspondingly selected "wrong" lead in accordance with the choice of the operator; the energization circuit for the "right" relay including normally closed contacts of the "wrong" relay; the energization circuit for the "wrong" relay including normally closed contacts of the "right" relay; each of said relays having holding circuits operated by normally open contacts thereof for energizing the corresponding relays independently of said control leads; a number of pairs of visually distinct electrically energizable lights at the master console for denoting the selections at the station consoles, one of each pair of lights being connected for operation with the corresponding "right" relays, and the others of each pair of lights being connected for operation with the corresponding "wrong" relays; a common return line for completing the energization circuits for the lights corresponding to the "right" relays; and a meter in said return line for displaying the combined number of energized "right" relays.

21. In apparatus of the class described: a number of sets of station consoles; switching means for each of the station consoles for registering one of a number of choices; circuit means for each of the station consoles selectively operable in accordance with the choice so registered; program means for determining in advance the acceptability or non-acceptability of the choice; each console having means operated by said circuit means and dependent upon said program means for signalling the selection of an acceptable choice; a printer having a plurality of resettable character positioning means and a print motor; selector switch means movable to a number of positions correspoding to the number of console sets and connecting the circuit means of the selected set to said character positioning means; cycle control means for successively operating the print motor and the selector switch means through a number of cycles correspoding to the number of sets of station consoles.

22. In apparatus as set forth in claim 21 together with a switch for initiating operation of said cycle control means upon movement from a normal position.

23. In apparatus of the class described: a master console; a plurality of station consoles; switching means for each of the station consoles operable at the station consoles for registering one of a number of choices; a pair of display devices corresponding to each of the station consoles and mounted on said master console; changeable program means operaitvely connecting the switching means to one of the corresponding pair of display devices selected by the program means when the switching means is operated to register certain choices; said program means operatively connecting the switching means to the other of the corresponding pair of display devices selected by the program means when the switching means is operated to register other choices; said program means serving to group the choices registered by the station switching means into two classes.

24. In apparatus of the class described: a master console; a plurality of station consoles; switching means for each of the station consoles operable at the station consoles for registering one of a number of choices; a pair of display devices corresponding to each of the station consoles and mounted on said master console; program means operatively connecting the switching means to one of the corresponding pair of display devices when the switching means is operated to register certain choices; said program means operatively connecting the switching means to the other of the corresponding pair of display devices when the switching means is operated to register other choices; said program means serving to group the choices registered by the station switching means into two classes; means for holding the first registered selection of said switching means; lockout means for preventing the registering of a second selection of said switching means; and reset means at the master console for resetting said holding and lockout means.

25. In apparatus of the class described: a master console; a plurality of station consoles; switching means for each of the station consoles operable at the station consoles for registering one of a number of choices; a pair of display devices corresponding to each of the station consoles and mounted on said master console; program means operatively connecting the switching means to one of the corresponding pair of display devices when the switching means is operated to register certain choices; said program means operatively connecting the switching means to the other of the corresponding pair of display devices when the switching means is operated to register other choices; said program means serving to group the choices registered by the station switching means into two classes; and display means operable by said switching means only after the switching means has registered a first choice for indicating the class of further choices registered by said switching means.

26. The combination as set forth in claim 23 in which said program means includes a corresponding number of separately operable switches mounted on said master console and corresponding to the choices registrable by the switching means.

27. In apparatus of the class described: a master console; a plurality of station consoles; switching means for each of the station consoles operable at the station consoles for registering one of a number of choices; a pair of display devices corresponding to each of the station consoles and mounted on said master console; program means operatively connecting the switching means to one of the corresponding pair of display devices when the switching means is operated to register certain choices; said program means operatively connecting the switching means to the other of the corresponding pair of display devices when the switching means is operated to register other choices; said program means serving to group the choices registered by the station switching means into two classes; said program means including decoding means cooperable with coded photographic slides or the like; and switch means operated by the decoding means and corresponding to the choices registerable by said switching means.

28. In apparatus of the class described: a master console; a plurality of station consoles; switching means for each of the station consoles operable at the station consoles for registering one of a number of choices; a pair of display devices corresponding to each of the station consoles and mounted on said master consoles; program means operatively connecting the switching means to one of the corresponding pair of display devices when the switching means is operated to register certain choices; said program means operatively connecting the switching means to the other of the corresponding pair of display devices when the switching means is operated to register other choices; said program means serving to group the choices registered by the station switching means into two classes; said program means comprising two alternately operable components, one component being a corresponding number of separately operable switches mounted on said master console and corresponding to the choices registerable by said switching means, the other component being decoding means cooperable with coded photographic slides or the like; and switch means operated by the decoding means and corresponding to the choices registerable by said switching means.

References Cited by the Examiner
UNITED STATES PATENTS

| | | | |
|---|---|---|---|
| 3,015,169 | 1/1962 | Chedister et al. | 35—11 |
| 3,095,654 | 7/1963 | Cummings | 35—9 |
| 3,186,109 | 6/1965 | Brinton | 35—48 |
| 3,190,014 | 6/1965 | Rhodes | 35—48 |

EUGENE R. CAPOZIO, *Primary Examiner.*

JEROME SCHNALL, *Examiner.*

R. E. KLEIN, R. W. WEIG, *Assistant Examiners.*